(12) United States Patent
Watanabe et al.

(10) Patent No.: US 7,929,127 B2
(45) Date of Patent: Apr. 19, 2011

(54) LASER ENERGY MEASURING UNIT AND LASER MACHINING APPARATUS

(75) Inventors: Fumio Watanabe, Ebina (JP); Katsurou Bukawa, Ebina (JP)

(73) Assignee: Hitachi Via Mechanics, Kanagawa (JP)

( * ) Notice: Subject to any disclaimer, the term of this patent is extended or adjusted under 35 U.S.C. 154(b) by 218 days.

(21) Appl. No.: 12/071,357

(22) Filed: Feb. 20, 2008

(65) Prior Publication Data

US 2008/0239300 A1 Oct. 2, 2008

(30) Foreign Application Priority Data

Mar. 28, 2007 (JP) ................................ 2007-085843

(51) Int. Cl.
  *G01J 1/10* (2006.01)
(52) U.S. Cl. .............. 356/229; 219/121.37; 219/121.83; 356/152.1
(58) Field of Classification Search ............. 219/121.67, 219/121.78, 121.83; 356/229, 152.1
See application file for complete search history.

(56) References Cited

U.S. PATENT DOCUMENTS

| | | | | |
|---|---|---|---|---|
| 3,515,489 A | * | 6/1970 | Chisholm | ..................... 356/432 |
| 4,538,884 A | * | 9/1985 | Masaki | ........................... 349/28 |
| 5,389,954 A | * | 2/1995 | Inaba et al. | ................... 347/258 |
| 2007/0075063 A1 | * | 4/2007 | Wilbanks et al. | ........ 219/121.85 |

FOREIGN PATENT DOCUMENTS

| | | |
|---|---|---|
| JP | 2-73301 | 3/1990 |
| JP | 2002-54989 | 2/2002 |
| JP | 2003-340577 | 12/2003 |

* cited by examiner

*Primary Examiner* — Gregory J Toatley
*Assistant Examiner* — Iyabo S Alli
(74) *Attorney, Agent, or Firm* — Wenderoth, Lind & Ponack, L.L.P.

(57) ABSTRACT

There is provided a laser energy measuring unit whose laser energy measuring range is widened. The laser energy measuring unit has a filter provided within an optical path of a laser to attenuate energy of the laser, a calculating section for measuring the energy of the laser passing through the filter, and a condenser lens provided on one side of the filter for condensing the laser. The filter has a shading portion for blocking a center part of the laser beam from being transmitted through the filter at a position coincident with the center of the laser. The center part of the laser where its energy is large is cut by the shading portion, and the calculating section measures the part where its energy is not so large. Thereby, it is possible to widen the laser energy measuring range.

9 Claims, 6 Drawing Sheets

LASER ENERGY MEASURING UNIT AND LASER MACHINING APPARATUS

BACKGROUND OF THE INVENTION

1. Field of the Invention

The present invention relates to a laser energy measuring unit and a laser machining apparatus having the laser energy measuring unit.

2. Related Art

Hitherto, when machining a blind hole (hereinafter referred to simply as a bore) that connects layers of a build-up type printed circuit board by the laser machining apparatus, an insulating layer formed by resin containing fillers such as fiberglass reinforced resin is removed by irradiating a laser through an etching window formed by removing an outer copper layer by etching in advance in a conformal mask method, or by directly irradiating a laser to the insulating layer having no outer copper layer in a direct method.

In this case, machining results vary when an output of the laser oscillator fluctuates. Then, in order to improve machining reliability, the laser to be supplied to the machining section is partly branched (1 to 2% of the laser to be supplied to the machining section) to measure energy of the branched laser and to machine while confirming that magnitude of the energy (referred to simply as "energy" hereinafter) of the laser is within a predetermined range.

FIG. 6 is a schematic section view of a prior art laser energy measuring unit along a measuring laser beam.

A condenser lens 17 and an energy measuring section 19 are disposed on an optical path of the measuring laser beam (called a "monitoring beam" hereinafter) 2b branched from the laser oscillated from the laser oscillator. The energy measuring section 19 is disposed so that a center of a sensor face of a sensor 23 substantially coincides with a focal point of the condenser lens 17.

Next, an operation of the laser energy measuring unit will be explained.

The monitoring beam 2b is condensed by the condenser lens 17 and enters the sensor 23. A calculating section 19a of the energy measuring section 19 compares an output of the sensor 23 with a value set in advance. When the energy of the monitoring beam 2b deviates out of the preset range, the energy measuring section 19a outputs an alarm signal to a control section 30 of the laser machining apparatus. Receiving the alarm signal from the energy measuring section 19, the control section 30 memorizes coordinates of a hole machined when it received the alarm signal and conducts a process specified in advance (sounds an alert buzzer or sometimes stops machining for example).

A diameter of a machining laser beam varies corresponding to a diameter of a bore to be machined. A diameter of the monitoring beam 2b entering the sensor 23 also changes, and the energy changes along with that. Therefore, it is necessary to use a sensor whose energy detecting range is as wide as the sensor 23. However, a sensor having a wide detecting range is expensive.

There has been proposed a technology of enabling even a sensor whose detecting range is narrow to measure the energy of laser by attenuating the energy of the monitoring beam 2b as disclosed in Japanese Patent Application Laid-open No. 2003-136267 for example. According to this technology, an attenuating member in which through holes of very small diameter are formed in mesh through a plain plate of a material that does not transmit the monitoring beam 2b is disposed on an incident side of the condenser lens 17 to attenuate the energy of the monitoring beam 2b. When the diameter of the monitoring beam 2b changes, the attenuating member can attenuate the energy corresponding to the diameter of the monitoring beam 2b. Accordingly, even the low cost sensor 23 can measure the energy of the monitoring beam 2b.

However, an energy attenuation rate of the attenuating member described above is uniform. Therefore, when the attenuation rate is once set by deciding the diameter and density of the through holes disposed on the plate by arranging to a maximum diameter of the monitoring beam 2b, energy detecting precision drops when the diameter of the monitoring beam 2b is minimum, causing variations in the measured results.

Accordingly, an object of the invention is to provide a laser energy measuring unit whose laser energy measuring range is wide and whose measuring precision is high.

It is another object of the invention to provide a laser machining apparatus that stops machining so as not to degrade its machining precision when the magnitude of the energy of the laser measured by the laser energy measuring unit deviates out of a predetermined range.

SUMMARY OF THE INVENTION

According to the invention, a laser energy measuring unit (32) has an attenuating member (21) provided within an optical path of laser (2b) to attenuate the energy of the laser (2b), and a measuring device (19) for measuring the energy of the laser (2b) passing through the attenuating member (21). The laser energy measuring unit includes a condenser lens (17) provided on one side of the attenuating member (21) for condensing the laser (2b) to the measuring device (19). The attenuating member (21) has a shading portion (21a) for blocking a center part of the laser (2b) from transmitting through the attenuating member at position coincident with the center of the laser (2b).

According to the invention, a laser machining apparatus (31) has a branching member (16) for branching a laser beam (2) oscillated from a laser oscillator (1) into a machining laser beam (2a) for machining workpieces and a measuring (monitoring) laser beam (2b) for measuring energy of the laser beam (2), and a laser energy measuring unit (32) for measuring the energy of the measuring laser beam (2b) and detecting an abnormal condition when the measured value of the measuring laser beam deviates out of a predetermined range. The laser energy measuring unit is the laser energy measuring unit (32) described above.

The laser energy measuring unit (32) attenuates the laser beam (2b) by the filter (21) before or after the condenser lens (17), and condenses the monitoring beam (2b) by the condenser lens (17) to measure the energy of the laser beam (2b) by the energy measuring device (19). The attenuating member (21) has a shading portion (21a) for blocking the center part of the laser beam (2b) from transmitting through the attenuating member at the position coincident with the center of the laser beam (2b) to shade the center part of the laser beam (2b). Therefore, the laser energy measuring unit (32) blocks the energy of the center part that largely differs corresponding to the diameter of the laser beam (2b), and measures the energy of the part whose energy is not so large by using the energy measuring device (19).

The laser machining apparatus (31) of the invention branches the laser (2) oscillated from the laser oscillator (1) by the beam splitter (branching member) (16) and the laser energy measuring unit (32) measures the branched measuring laser (2b) to detect the abnormal condition when the measured energy value deviates out of the predetermined range.

The laser machining apparatus (31) stops machining when the laser energy measuring unit (32) detects the abnormal condition.

It is noted that the purpose of the reference numerals within the parentheses above is to collate them with parts within the drawings, and does not limit the structure of the invention by any means.

Accordingly, the laser energy measuring unit of the invention brings about the following effects because it measures the energy of the part of the laser whose energy is not so large.

That is, it becomes possible to measure the energy even by a low cost measuring means. It is also possible to widen the laser energy measuring range. Still more, it is possible to enhance the laser measuring precision and to set an attenuation rate of the attenuating member without linking to the diameter of the laser.

The laser machining apparatus of the invention may also be arranged so as not to degrade its machining precision because it stops machining when the magnitude of the energy of the laser measured by the laser energy measuring unit deviates out of the predetermined range.

DETAILED DESCRIPTION OF THE INVENTION

A laser energy measuring unit according to an embodiment of the invention and a laser machining apparatus having this measuring unit will be now be explained.

Figure 1:
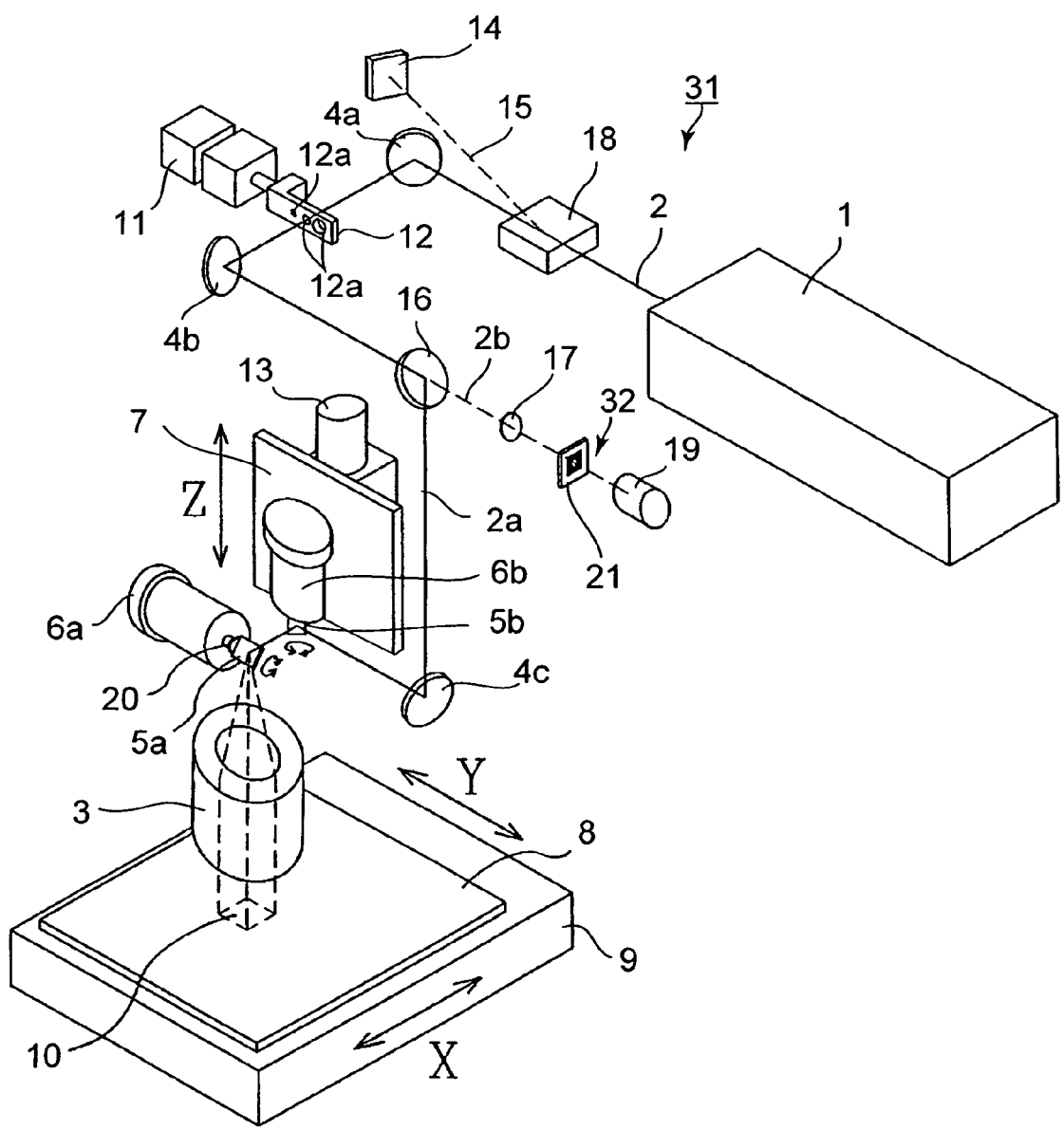
FIG. 1 is an exploded perspective view of a laser machining apparatus according to an embodiment of the invention.
Figure 2:
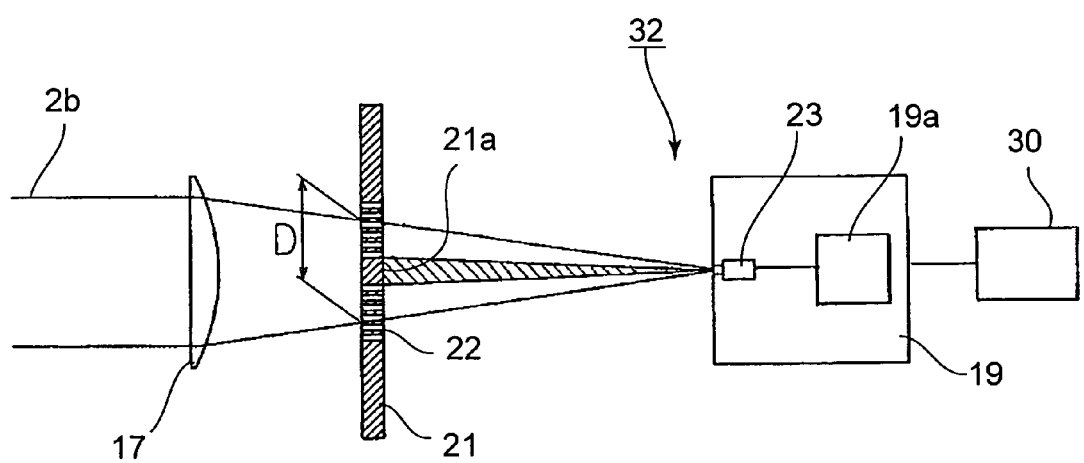
FIG. 2 is a schematic section view of a laser energy measuring unit of the embodiment of the invention along a measuring laser.
Figure 3:
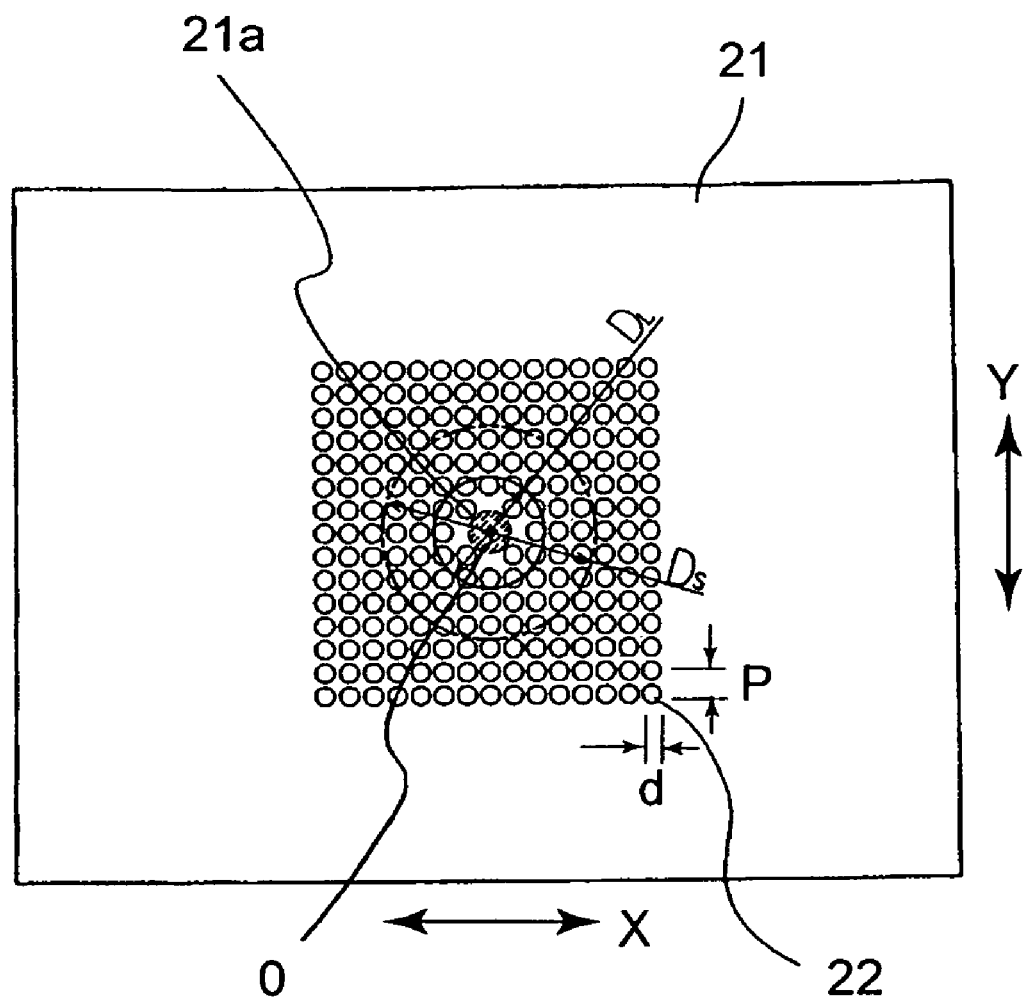
FIG. 3 is a plan view of a filter of the laser energy measuring unit of the embodiment of the invention.

FIG. 1 is an exploded perspective view of the laser machining apparatus of the embodiment of the invention, FIG. 2 is a schematic section view of the laser energy measuring unit of the embodiment of the invention along a measuring laser and FIG. 3 is a plan view of a filter of the laser energy, measuring unit of the embodiment of the invention.

The laser machining apparatus will be explained first.

The laser machining apparatus 31 is arranged so as to make bores through a printed circuit board 8 by a machining laser beam 2a. A pulse shaper 18, a total reflection mirror 4a, a mask 12, a total reflection mirror 4b and a beam splitter (branching member) 16 are disposed on an optical axis of the laser 2 outputted out of a laser oscillator 1. The laser oscillator 1 outputs the pulse-wise laser 2. The pulse shaper 18 is arranged so as to control intensity and pulse width of the laser 2 supplied to a machining section. It is noted that zero-order light 15 not supplied to the machining section is absorbed by a beam damper 14. A plurality of mask holes 12a (a total of three in FIG. 1) with different diameter are formed through the mask 12 supported by a two-step cylinder 11. The beam splitter 16 is arranged so as to transmit 2% of the incident laser 2 and to reflect the remainder.

A total reflection mirror 4c, scanner mirrors 5b and 5a and a fθ lens 3 on the reflection side of the beam splitter 16 and a condenser lens 17, a filter (attenuating member) 21 and an energy measuring device 19 are disposed on the transmission side of the beam splitter 16. The condenser lens 17, the filter 21 and the energy measuring device 19 compose a laser energy measuring unit 32.

The scanner mirrors 5a and 5b are positioned by being rotated centering on axes of rotation respectively by scanners 6a and 6b. The total reflection mirror 4c, the scanners 6a and 6b and the fθ lens 3 are mounted on a machining head 7. The machining head 7 is arranged to be movable in a direction of an arrow Z by a Z-axis motor 13.

A printed circuit board 8 is fixed on an X-Y table 9 movable in directions of arrows X and Y while facing the fθ lens 3. The size of a machining area 10 defined by the diameter of the fθ lens 3 is about 50 mm×50 mm.

Next, a machining operation of the laser machining apparatus 31 will be explained.

Prior to machining, the fθ lens 3 is positioned in the direction of the arrow Z based on a surface of the printed circuit board 8 and a center of the machining area 10 to be machined is positioned on an optical axis of the fθ lens 3. The two-step cylinder 11 is also operated to position the optimum mask hole 12a for the diameter of the bore to be machined on the optical axis of the laser beam 2.

The pulse shaper 18 sets the energy level (i.e., intensity and pulse width) of the laser beam outputted out of the laser oscillator 1. The mask hole 12a of the mask 12 shapes an outline of the laser beam 2. Then, the laser beam 2 enters the beam splitter 16. 2% of the incident laser beam 2 transmits through the beam splitter 16 and enters the condenser lens 17 as the monitoring (measuring) beam 2b. The remaining portion of the laser beam 2 reflected by the beam splitter 16 which forms machining beam 2a is positioned by the scanner mirrors 5b and 5a and enters the fθ lens 3. Then, the machining beam 2a is vertically irradiated to the printed circuit board 8 to create a bore.

The energy of the monitoring measuring beam 2b is measured by the laser energy measuring unit 32 described below. When a value of the measured energy is out of a predetermined range, the laser energy measuring unit 32 informs the control section 30 to stop the machining operation of the laser machining apparatus 31.

Next, the laser energy measuring unit will be explained in detail.

The laser energy measuring unit 32 measures the energy of the monitoring beam 2b and informs the control section 30 to stop the machining operation of the laser machining apparatus 31 carried out by the machining beam 2a when the value of the measured energy is out of the predetermined range.

The laser energy measuring unit 32 includes the condenser lens 17, the filter 21, the energy measuring device 19 and other components as shown in FIG. 2.

The filter (attenuating member) 21 is made from a copper plate, for example, and through holes 22 having a small diameter (diameter d=0.5 mm for example) with a pitch of P=1 mm for example are formed in a grid pattern in the directions of arrows X and Y, except for a circular shading portion 21a that is centered at a center position O and that blocks the transmission of the laser, as shown in FIG. 3. It is noted that (Ds) in FIG. 3 indicates a range into which the monitoring beam 2b enters when the diameter of the mask hole 12a is small, and (DL) indicates a range into which the monitoring beam 2b enters when the diameter of the mask 12 is large.

The monitoring beam 2b transmitting through the beam splitter 16 (FIG. 1) enters the sensor 23 of the energy measuring section 19 by being condensed by the condenser lens 17 and by being attenuated by the filter 21 as shown in FIG. 2. A calculating section 19a of the energy measuring device 19 compares an output of the sensor 23 with an energy value set in advance. Then, when the energy of the monitoring beam 2b deviates out of the range set in advance, the energy measuring device 19 outputs an alarm signal that indicates an abnormal condition to the control section 30 that controls the whole laser machining apparatus 31.

Next, a role of the filter 21 will be explained.

Figure 4A:
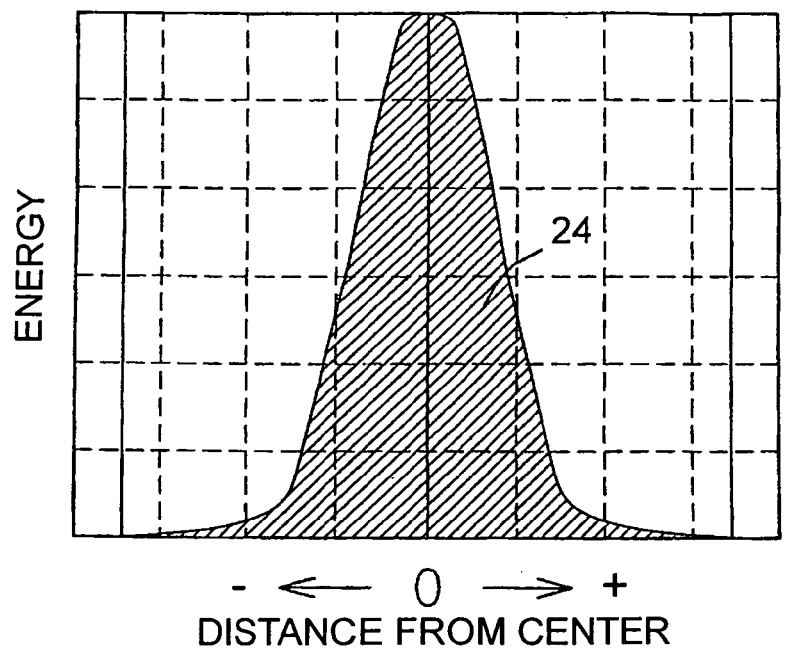
FIGS. 4A and 4B are graphs showing distributions of intensity of the laser entering a beam splitter on a plane perpendicular to an optical axis of the laser.
Figure 4B:
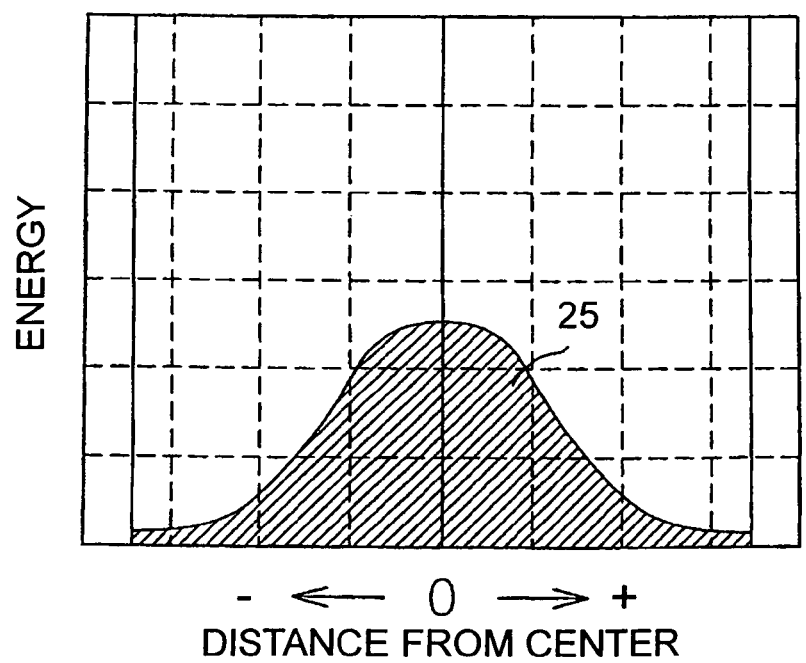
Figure 5A:
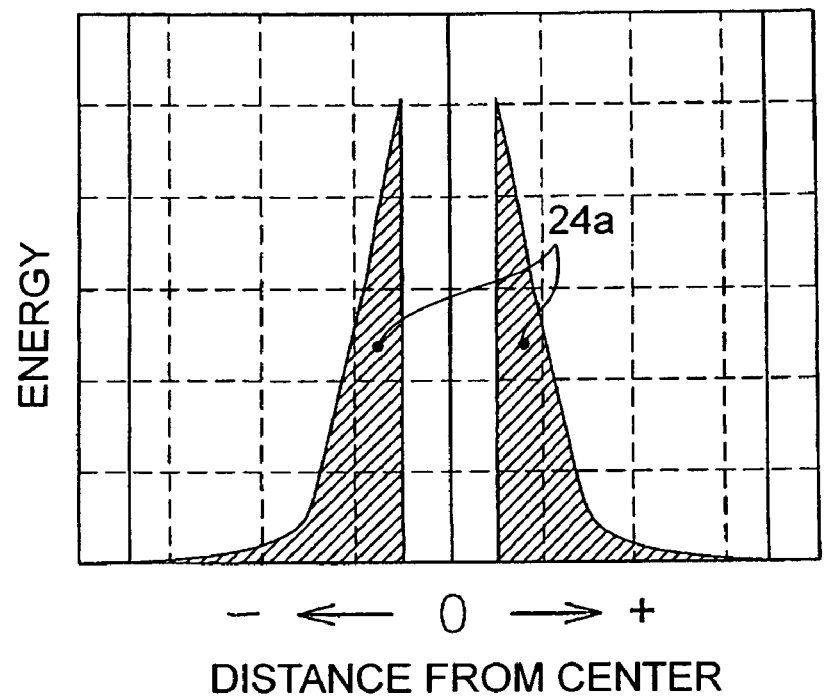
FIGS. 5A and 5B are graphs showing energy of a monitoring beam passing through the filter on the plane perpendicular to an optical axis of the laser beam.
Figure 5B:
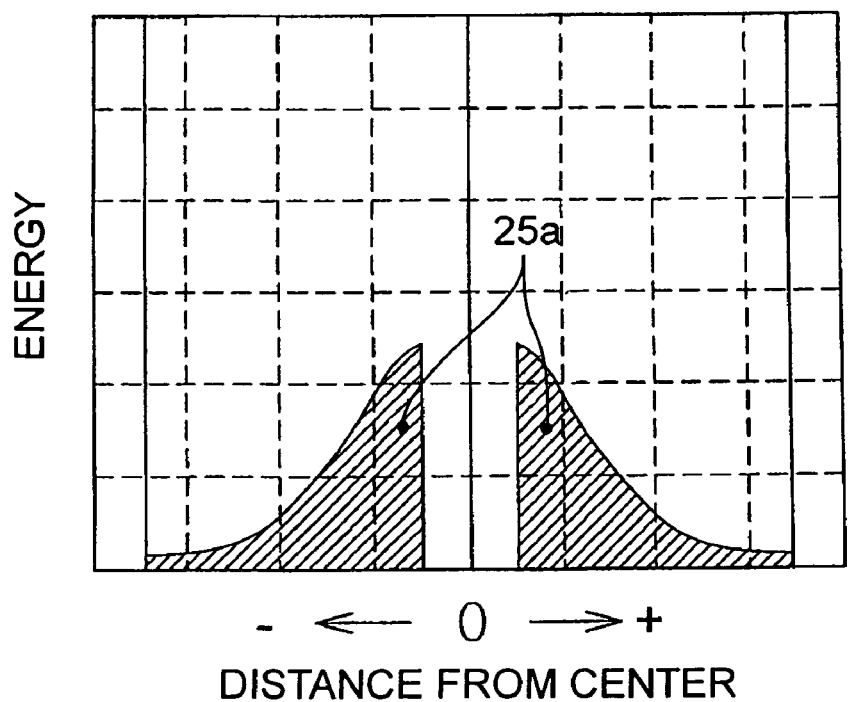
Figure 6:
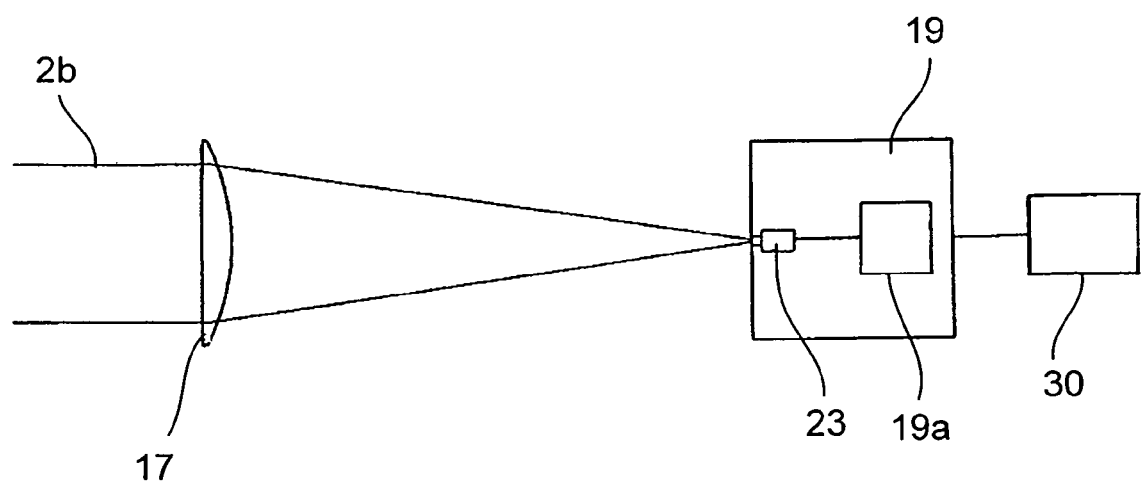
FIG. 6 is a schematic section view of a prior art laser energy measuring unit along a measuring laser beam.

FIGS. 4A and 4B are graphs showing distributions of intensity of the laser beam entering the beam splitter 16 on a plane perpendicular to the optical axis of the laser 2, and FIGS. 5A and 5B are graphs showing energy of the monitoring beam 2b passing through the filter 21 on the plane perpendicular to the optical axis the monitoring beam 2b. Axes of abscissa of FIGS. 4 and 5 represent distances from the optical axis and axes of ordinate represent the energy. Then, areas of regions 24 and 25 denoted by slant lines represent amounts of energy.

While the diameter of the laser 2 transmitting through the mask hole 12a gradually increases, the rate of increase of the diameter and the distribution of intensity (i.e., distribution of energy) on the plane perpendicular to the optical axis differs depending on the diameter of the mask hole 12a. That is, when the diameter of the mask hole is large, the intensity of the center part is large and the diameter of the beam does not increase (is not widened) so much as shown in FIG. 4A. In contrast to that, when the diameter of the mask hole is small, although the intensity of the center part does not increase so much, the diameter of the beam becomes large (widened) as shown in FIG. 4B.

Because the filter 21 has the shading portion 21a at its center, the monitoring beam 2b having the distribution of energy of FIG. 4A will have a distribution of energy as shown in FIG. 5A when it transmits through the filter 21. The monitoring beam 2b having the distribution of energy of FIG. 4B will have a distribution of energy as shown in FIG. 5B when it transmits through the filter 21.

As a result, there is almost no difference between the slanted area of the region 24a and that of the region 25a (i.e., the amount of energy detected by the sensor 23) in FIGS. 5A and 5B. That is, the energy of the monitoring beam 2b entering the sensor 23 is substantially the same regardless of the diameter of the mask holes 12a.

Accordingly, no saturation of output signal nor burning damage of the sensor 23, that may otherwise occur due to excessive energy of the monitoring beam 2b, occurs. The sensor is also not affected by noise that may otherwise occur when the energy of the monitoring beam 2b is too small. Still more, a general purpose sensor may be used as the sensor 23.

It is noted that the shape of the filter 21 shading the center part of the monitoring beam 2b is not limited to be circular, and it may have another shape such as a polygonal shape.

Still more, it is also possible to prepare a plurality of filters whose diameter d and pitch P of the through holes 22 are changed to correspond to the output of the laser 2.

What is claimed is:

1. A laser energy measuring unit comprising:
a mask having a plurality of mask holes with different diameters, said mask being configured so that one of said mask holes is selectively positioned within an optical path of a laser beam;
an attenuating member within the optical path of the laser beam downstream of said mask so as to attenuate energy of the laser beam having passed through said mask, said attenuating member having:
a circular shading portion located so as to block a center part of the laser beam having passed through said mask from passing through said attenuating member at a position coincident with a center of the laser beam having passed through said mask; and
a plurality of through holes arranged around said circular shading portion for attenuating the laser beam having passed through said mask, said through holes being formed in a formation area of said attenuating member wider than a spread area of said attenuating member through which energy of the laser beam having passed through said mask is distributed;
a measuring device for measuring the energy of the laser beam having passed through said attenuating member such that a center part of an energy of the laser beam has been blocked by said circular shading portion of said attenuating member to thereby minimize the energy of the laser beam; and
a condenser lens located at one side of said attenuating member, said condenser lens being configured to condense the laser beam having passed through said mask to said measuring device.

2. The laser energy measuring unit of claim 1, wherein said measuring device includes:
a sensor for sensing an energy level of the laser beam having passed through said attenuating member; and
a calculation section for comparing an energy level sensed by said sensor to a pre-set energy value.

3. The laser energy measuring unit of claim 1, wherein said shading portion is located so as to block a center-most part of the laser beam having passed through said mask from passing through said attenuating member at a position coincident with a center-most axis of the laser beam having passed through said mask.

4. A laser machining apparatus, comprising:
a branching member for splitting a laser beam oscillated from a laser oscillator into a machining laser beam for machining workpieces and a measuring laser beam to be measured to determine an energy level of the laser beam; and
a laser energy measuring unit for measuring the energy level of the measuring laser beam, and for detecting an abnormal condition when the measured value of the measuring laser beam deviates from a predetermined range, said laser energy measuring unit comprising:
a mask having a plurality of mask holes with different diameters, said mask being configured so that one of said mask holes is selectively positioned within an optical path of the laser beam;
an attenuating member within the optical path of the measuring laser beam downstream of said mask so as to attenuate energy of the measuring laser beam, said attenuating member having:
a circular shading portion located so as to block a center part of the measuring laser beam from passing through said attenuating member at a position coincident with a center of the measuring laser beam; and
a plurality of through holes arranged around said circular shading portion for attenuating the measuring laser beam, said through holes being formed in a formation area of said attenuating member wider than a spread area of said attenuating member through which energy of the measuring laser beam is distributed;

a measuring device for measuring the energy of the measuring laser beam having passed through said attenuating member such that a center part of an energy of the laser beam has been blocked by said circular shading portion of said attenuating member to thereby minimize the energy of the laser beam; and a condenser lens located at one side of said attenuating member, said condenser lens being configured to condense the measuring laser beam having passed through said mask to said measuring device;

wherein said branching member is located downstream of said mask so as to split the laser beam having passed through said mask.

5. The laser machining apparatus of claim 4, wherein said measuring device includes:

a sensor for sensing an energy level of the measuring laser beam having passed through said attenuating member; and a calculation section for comparing an energy level sensed by said sensor to a pre-set energy value.

6. The laser machining apparatus of claim 5, further comprising a control section for receiving a signal from said measuring device, and for stopping a machining operation when the energy level sensed by said sensor deviates from the pre-set energy value.

7. The laser machining apparatus of claim 4, wherein said shading portion is located so as to block a center-most part of the laser beam having passed through said mask from passing through said attenuating member at a position coincident with a center-most axis of the laser beam having passed through said mask.

8. The laser energy measuring unit of claim 1, wherein said through holes of said attenuating member are arranged so as to entirely surround said circular shading portion.

9. The laser machining apparatus of claim 4, wherein said through holes of said attenuating member are arranged so as to entirely surround said circular shading portion.

\* \* \* \* \*